US008554554B2

(12) United States Patent
Johnston et al.

(10) Patent No.: US 8,554,554 B2
(45) Date of Patent: *Oct. 8, 2013

(54) AUTOMATED DEMOGRAPHIC ANALYSIS BY ANALYZING VOICE ACTIVITY

(75) Inventors: Michael Johnston, New York, NY (US); Hisao M. Chang, Cedar Park, TX (US); Harry E. Blanchard, Rumson, NJ (US); Bernard S. Renger, New Providence, NJ (US); Linda Roberts, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,006

(22) Filed: Aug. 13, 2012

(65) Prior Publication Data
US 2012/0323566 A1 Dec. 20, 2012

Related U.S. Application Data

(63) Continuation of application No. 12/344,981, filed on Dec. 29, 2008, now Pat. No. 8,301,444.

(51) Int. Cl.
*G10L 15/00* (2013.01)
*G10L 21/00* (2013.01)

(52) U.S. Cl.
USPC .................. 704/231; 704/270; 704/270.1

(58) Field of Classification Search
USPC ........................... 704/231, 270, 270.1
See application file for complete search history.

(56) References Cited

U.S. PATENT DOCUMENTS

| 5,553,119 A | 9/1996 | McAllister et al. |
| 6,125,343 A | 9/2000 | Schuster |
| 6,377,995 B2 | 4/2002 | Agraharam et al. |
| 6,415,257 B1 | 7/2002 | Junqua et al. |
| 7,263,489 B2 | 8/2007 | Cohen et al. |
| 7,349,527 B2 | 3/2008 | Yacoub et al. |
| 7,669,123 B2 | 2/2010 | Zuckerberg et al. |
| 7,778,837 B2 | 8/2010 | Thiesson et al. |
| 7,949,526 B2 | 5/2011 | Ju et al. |
| 2002/0072952 A1 | 6/2002 | Hamzy et al. |
| 2004/0030550 A1 | 2/2004 | Liu et al. |
| 2004/0036622 A1 | 2/2004 | Dukach et al. |
| 2004/0181391 A1 | 9/2004 | Inoue et al. |
| 2007/0130588 A1* | 6/2007 | Edwards et al. ............ 725/59 |

* cited by examiner

*Primary Examiner* — Jesse Pullias
(74) *Attorney, Agent, or Firm* — Greenblum & Bernstein, P.L.C.

(57) ABSTRACT

Methods, systems, and media for determining a response to be generated in an environment are provided. The methods, systems, and media monitor the environment for a voice activity of an individual. The voice activity of the individual is detected and analyzed. A content descriptor of the voice activity is determined based on the voice activity of the individual. A demographic descriptor of the individual is determined based on the voice activity of the individual. The content descriptor, the demographic descriptor, and known information are correlated to determine the response to be generated in the environment.

20 Claims, 5 Drawing Sheets

AUTOMATED DEMOGRAPHIC ANALYSIS BY ANALYZING VOICE ACTIVITY

CROSS REFERENCE TO RELATED APPLICATION

This application is a continuation of pending U.S. patent application Ser. No. 12/344,981, filed Dec. 29, 2008, the contents of which are expressly incorporated by reference herein in their entirety.

BACKGROUND

1. Field of the Disclosure

The present disclosure relates to demographic profiling. More particularly, the present disclosure relates to automated generation and analysis of demographic profile information of an individual.

2. Background Information

Traditionally, advertising and marketing materials have been targeted to particular individuals who are most likely to be interested in the specific advertising and marketing materials. The advertising and marketing materials are generally targeted to particular individuals according to demographic profiling.

Recently, there has been an increase in the number of available advertising and marketing venues. The new, generally electronic advertising and marketing venues typically require advertisers and marketers to remotely profile an individual according to his or her demographic characteristics. With respect to the electronic venues, marketers and advertisers have developed methodologies of identifying individuals through the use of user entered usernames and passwords. Upon the entering of a valid username and password, an individual can be identified via a user profile that is associated with the entered username.

DETAILED DESCRIPTION

Figure 1:
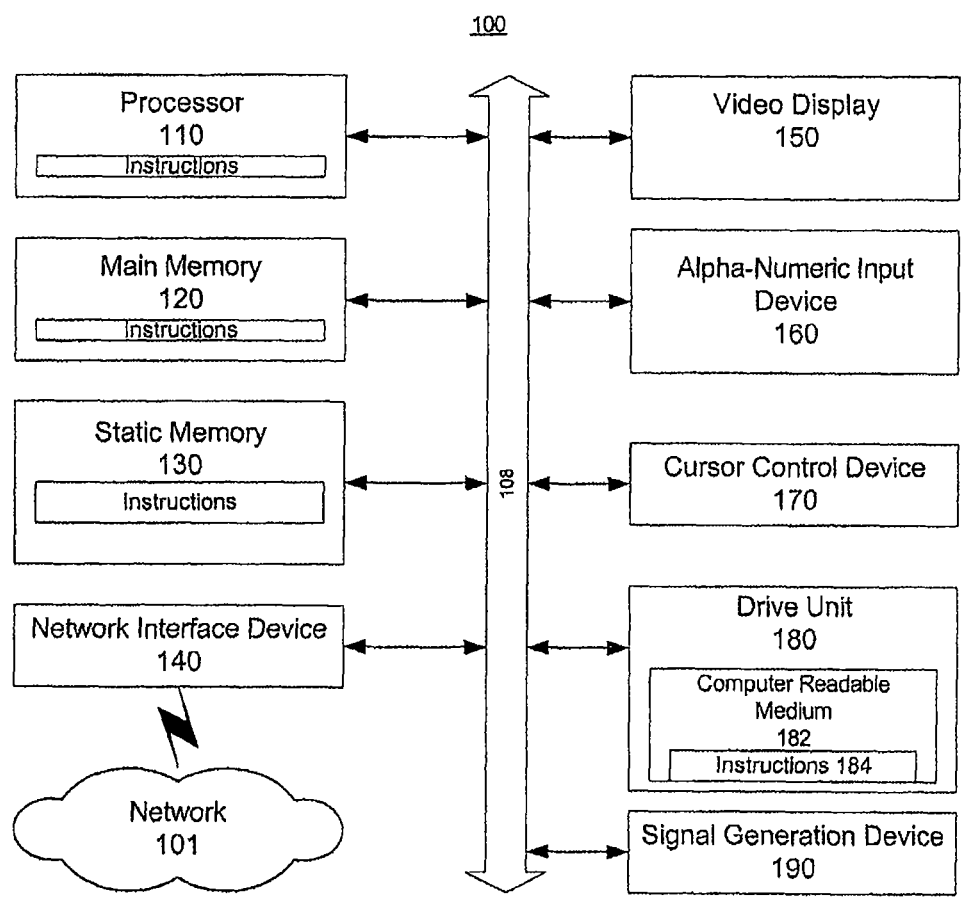
FIG. 1 shows an exemplary general computer system that includes a set of instructions for generating demographic information relating to an individual.

In view of the foregoing, the present disclosure, through one or more of its various aspects, embodiments and/or specific features or sub-components, is thus intended to bring out one or more of the advantages as specifically noted below.

According to an embodiment of the present disclosure, a method of generating demographic information relating to an individual includes monitoring an environment for a voice activity of an individual, detecting the voice activity of the individual, analyzing the detected voice activity of the individual, and determining, based on the detected voice activity of the individual, a demographic descriptor of the individual.

According to one aspect of the present disclosure, the method includes recognizing speech in the detected voice activity, analyzing the recognized speech, determining, based on the recognized speech, a content descriptor of the voice activity of the individual, and correlating the demographic descriptor of the individual and the content descriptor of the voice activity of the individual to determine a response to be generated.

According to another aspect of the present disclosure, the method includes correlating known information of the environment with the recognized and analyzed speech of the voice activity to determine, based on the correlated known information and the recognized and analyzed speech, the content descriptor of the voice activity of the individual.

According to yet another aspect of the present disclosure, a plurality of voice activities is detected, each belonging to one of a plurality of individuals, and the method includes selecting one of the plurality of voice activities to be a representative voice activity of the plurality of voice activities for analyzing the selected representative voice activity and determining, based on the selected representative voice activity, the demographic descriptor of the plurality of individuals.

According to still another aspect of the present disclosure, the representative voice activity is selected by filtering the plurality of voice activities according to a predetermined paralinguistic property.

According to an additional aspect of the present disclosure, a plurality of the voice activities is detected, each belonging to one of a plurality of individuals, and a demographic descriptor is determined for each of the plurality of individuals based on the detected voice activities of each of the plurality of individuals.

According to another aspect of the present disclosure, the method includes generating a plurality of responses in the environment with each response being generated in response to one demographic descriptor of each of the plurality of individuals.

According to yet another aspect of the present disclosure, the method includes generating a response in the environment in response to the determined demographic descriptor.

According to still another aspect of the present disclosure, the method includes correlating the demographic descriptor with known information of the individual to determine the response to be generated.

According to an additional aspect of the present disclosure, the method includes looking up the demographic descriptor in a database to determine the response to be generated.

According to another aspect of the present disclosure, the method includes detecting visual activity of the individual, analyzing the detected visual activity of the individual, and correlating the analyzed voice activity and the analyzed visual activity of the individual to determine the demographic descriptor.

According to yet another aspect of the present disclosure, the voice activity is detected with an audio capture device that includes an input configured to enable the individual to input an inputted activity for determining the demographic descriptor.

According to still another aspect of the present disclosure, the method includes storing the determined demographic descriptor in a database and associating it with the individual for creating a profile of the individual.

According to an additional aspect of the present disclosure, the profile associated with the individual is configured to be accessible by the individual for displaying the profile on a social networking website.

According to another aspect of the present disclosure, the method includes detecting the voice activity of the individual for a predetermined period of time to analyze the voice activity detected over the predetermined period of time to determine a general demographic descriptor of the individual According to yet another aspect of the present disclosure, the voice activity is detected with an audio capture device, and the detected voice activity is transmitted over a network for analyzing the voice activity to determine the demographic descriptor According to another embodiment of the present disclosure, a system for generating demographic information relating to an individual includes an audio capture device disposed in an environment for detecting a voice activity of an individual, and an analyzer that analyzes the detected voice activity to determine, based on the detected voice activity, a demographic descriptor of the individual.

According to one aspect of the present disclosure, the audio capture device is configured to detect a plurality of the voice activities, each belonging to one of a plurality of individuals, and to select one of the plurality of voice activities to be a representative voice activity of the plurality of voice activities for determining, based on the selected representative voice activity, the demographic descriptor of the plurality of individuals.

According to another embodiment of the present disclosure, a tangible computer readable medium for storing a computer program for generating demographic information relating to an individual includes an executable monitoring code segment that monitors an environment for a voice activity of an individual, an executable detecting code segment that detects the voice activity of the individual in the environment, an executable analyzing code segment that analyzes the detected voice activity, and an executable determining code segment that determines, based on the detected voice activity of the individual, a demographic descriptor of the individual.

According to one aspect of the present disclosure, the detecting code segment detects a plurality of the voice activities, each belonging to one of a plurality of individuals, and the computer readable medium includes an executable selecting code segment that selects one of the plurality of voice activities to be a representative voice activity, wherein the determining code segment determines, based on the selected representative voice activity, the demographic descriptor of the plurality of individuals.

FIG. 1 is an illustrative embodiment of a general computer system, on which a method to provide automated demographic analysis can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
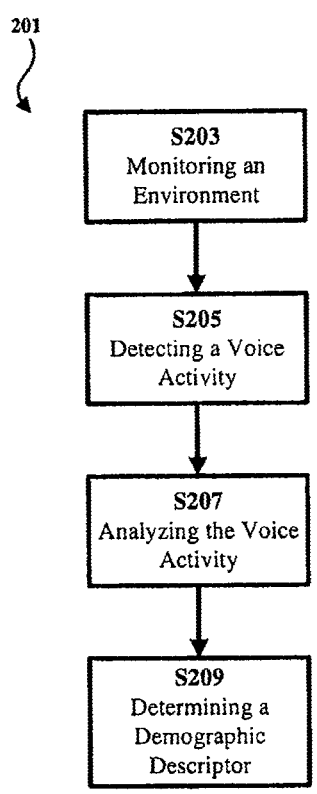
FIG. 2 is a flowchart of an embodiment of a method for generating demographic information relating to an individual, according to an aspect of the present disclosure.

A method of generating demographic information relating to an individual is generally shown at 201 in FIG. 2. According to the method 201, in step S203, an environment is monitored for the voice activity of an individual. The environment is preferably an uncontrolled environment, however, those skilled in the art will appreciate that the environment may be a controlled environment. The environment may be either a private environment or a public environment, such as, but not limited to, a home, a business, or a walkway. For example, the environment to be monitored Times Square in New York City, a shopping mall, or the area surrounding the pumps at a gas station. Of course, those skilled in the art will appreciate that other environments are likewise appropriate for use with the present disclosure.

In step S203, the environment may be monitored continuously, or the environment may be monitored intermittently. Furthermore, in additional embodiments, the monitoring may be time sensitive, or the monitoring may be activated by an individual. Of course, those skilled in the art will appreciate that additional methods of monitoring an environment are likewise appropriate for use with the present disclosure.

The voice activity for which the environment is monitored in step S203 may be either the voice activity of a known individual, or the voice activity of an unknown individual. For example, in an exemplary embodiment of the method 201, a home is monitored for the voice activity of a known individual. In another exemplary embodiment of the method 201, a public walkway is monitored for the voice activity of an unknown passerby. Of course, those skilled in the art will appreciate that the embodiments of the method 201 as described above are to be considered merely exemplary and are not intended to be limiting.

The method 201 as shown in FIG. 2 includes, in step S205, detecting the voice activity of the individual, and in step S207, analyzing the detected voice activity of the individual. Furthermore, in step S209, a demographic descriptor of the individual is determined based on the analyzed and detected voice activity. In an embodiment of the method 201, a single voice activity of the individual is detected to determine a specific demographic descriptor. However, in an alternative embodiment of the method 201, the voice activity of the individual is detected for a predetermined period of time to determine a general demographic descriptor of the individual.

The detected voice activity may be analyzed according to, but not limited to, the linguistic properties of the voice activity or the paralinguistic properties of the voice activity. Additionally, or alternatively, the voice activity may be analyzed according to any combination of linguistic and/or paralinguistic properties in order to determine the demographic descriptor. In this regard, the demographic descriptor may be any descriptor which identifies a characteristic of the individual. For example, the demographic descriptors may include, but are not limited to, age, race, nationality, gender, educational attainment, and location. Of course, those skilled in the art will appreciate that additional demographic descriptors may be used in addition to, or alternatively to, the demographic descriptors listed above.

Figure 5:
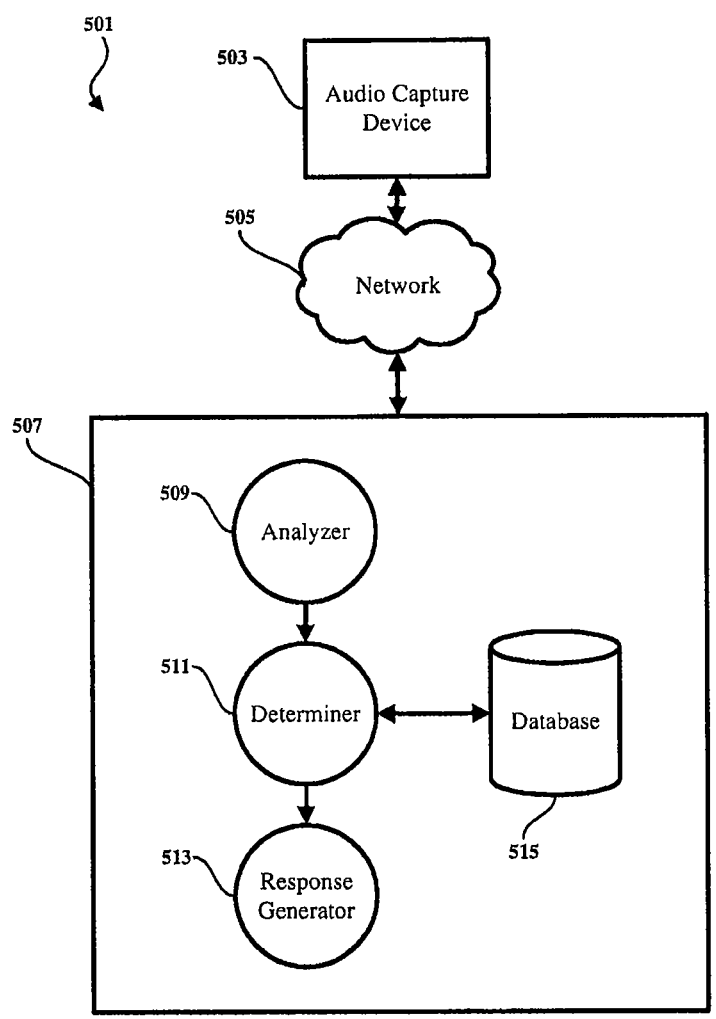
FIG. 5 is a schematic of a system for generating demographic information relating to an individual.

In the embodiment of the method 201 as shown in FIG. 2, the voice activity is generally detected with an audio capture device. In an embodiment of the method 201, the voice activity is then analyzed, in step S207, by the audio capture device. However, in an alternative embodiment, as shown in FIG. 5, the detected voice activity is transmitted from the audio capture device 503 via a network 505 for analyzing the voice activity on the backend of the network 507 to determine the demographic descriptor.

In the method 201 as shown in FIG. 2, a response is preferably generated by a response generator in response to the determined demographic descriptor. The response can either be generated in the environment, or the voice activity can be transmitted across a network and the response can be generated on the backend of the network and sent back to the environment. In one embodiment of the method 201, the response to be generated is determined by looking up the demographic descriptor in a database. In another embodiment of the method 201, the response to be generated is determined by correlating the demographic descriptor with known information of the individual. The known information may include billing information of the individual or any other known information relating to the individual.

In yet another embodiment of the method 201, the demographic descriptor is stored in a database and associated with the individual for creating a profile of the individual. In such an embodiment, the profile associated with the individual is preferably configured to be accessible by the individual for displaying the profile on a social networking website.

In an additional embodiment of the method 201 as shown in FIG. 2, the method 201 further includes detecting visual activity of the individual, analyzing the detected visual activity of the individual, and correlating the analyzed voice activity and the analyzed visual activity of the individual to determine the demographic descriptor. In such an embodiment, the visual activity is preferably detected with a video capture device.

In a further embodiment of the method 201 as shown in FIG. 2, the voice activity is detected in step S205 with an audio capture device that includes an input. The input is preferably configured to enable the individual to input an inputted activity. The input may be either a direct input, a speech input, or a combination thereof. Of course, those skilled in the art will appreciate that other commonly known methods of inputting data or speech may also be employed. In such an embodiment, the demographic descriptor is determined based on the inputted activity. In an alternative embodiment, the demographic descriptor is determined by correlating the inputted activity and the analyzed voice activity. In a further embodiment, the audio capture device is configured to enable the individual to accept or reject a demographic descriptor determined based on the analyzed voice activity.

Figure 3:
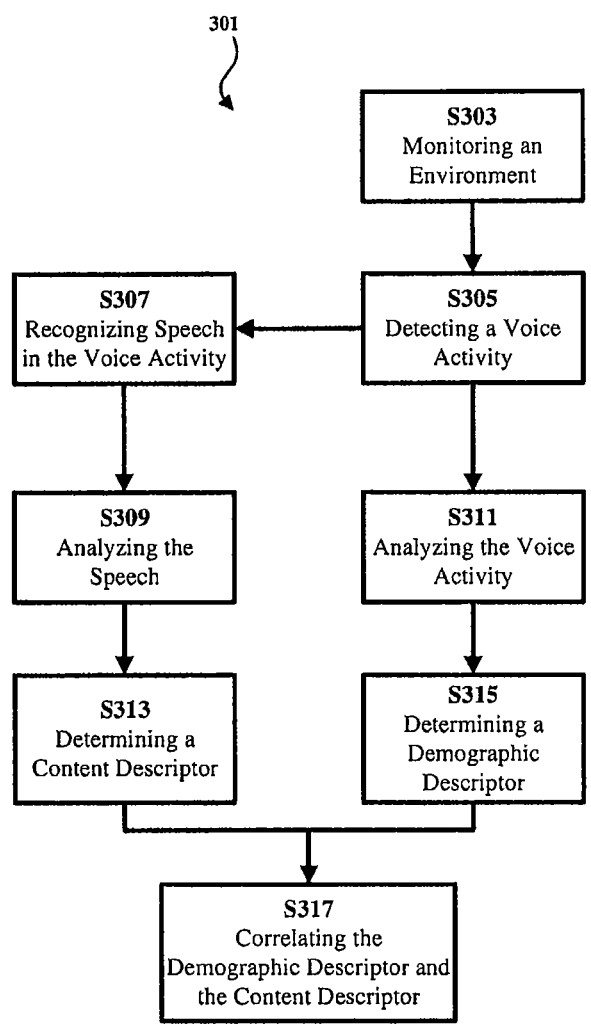
FIG. 3 is a flowchart of an embodiment of a method for generating demographic information relating to an individual including correlating the demographic information with speech content, according to an aspect of the present disclosure.

In an embodiment of the present disclosure as shown in FIG. 3, a method of generating demographic information relating to an individual is generally shown at 301 and includes, in step S303, monitoring an environment for a voice activity of an individual. Upon detecting the voice activity of the individual in step S305, speech is recognized in the detected voice activity in step S307. Then, the recognized speech is analyzed in step S309 and a content descriptor of the voice activity is determined, in step S313, based on the recognized speech. Furthermore, the voice activity is also analyzed in step S311 and a demographic descriptor of the individual is determined based on the detected voice activity in step S315. Accordingly, the demographic descriptor of the individual and the content descriptor of the voice activity of the individual are correlated in step S317 to determine a response to be generated.

For example, in the method 301 as shown in FIG. 3, a voice activity consisting of "the football game was exciting" may be detected in step S305. The speech is recognized and analyzed in steps S307 and S309 respectively, and, in step S313, it is determined that the voice activity relates to football. Furthermore, the voice activity is analyzed in step 311, and based on the paralinguistic and linguistic properties of the voice activity it is determined, in step S315, that the individual is a male teenager. Accordingly, in step S317, the descriptors of a male teenager and football are correlated to determine a response to be generated. Of course, those skilled in the art will appreciate that the example described above is to be considered merely exemplary and is not to be considered limiting.

In an alternative embodiment of the method 301 as shown in FIG. 3, the method includes correlating known information of the environment with the recognized and analyzed speech of the voice activity to determine, based on the correlated known information and the recognized and analyzed speech, the content descriptor of the voice activity of the individual. The known information is preferably variable content played on a television, displayed on a computer, or played on a radio. Thus the known information may be correlated with the recognized and analyzed speech in an integrated system to determine the content descriptor. For example, the environment may be a room that includes a television, and it may be known that a movie staged in New Zealand is playing on the television. Then, a voice activity consisting of, "I would love to see that place" may be detected in step S305. The speech is recognized and analyzed in steps S307 and S309 respectively, and the known information of the environment is correlated with the recognized and analyzed speech. Accordingly, in step S313, a content descriptor of the voice activity, such as travel to New Zealand, is determined based on correlating the known information with the recognized speech. Of course, those skilled in the art will appreciate that the example described above is to be considered merely exemplary and is not to be considered limiting. Furthermore, those skilled in the art will appreciate that the known information of the environment may include additional information, such as, but not limited to, a website currently being visited.

Figure 4:
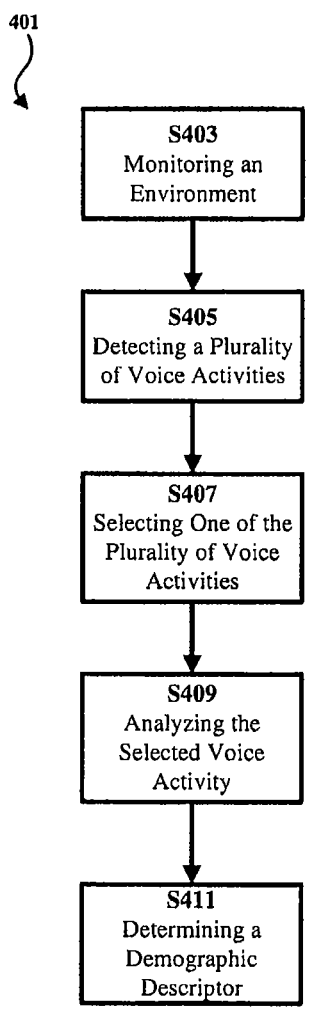
FIG. 4 is a flowchart of an embodiment of a method for generating demographic information relating to a plurality of individuals, according to an aspect of the present disclosure.

In another embodiment of the present disclosure, as shown in FIG. 4, a method of generating demographic information relating to an individual is generally shown at 401 and includes, in step S403, monitoring an environment for a voice activity of an individual. At step S405, a plurality of voice activities is detected, each belonging to one of a plurality of individuals. The method also includes, in step S407, selecting one of the plurality of voice activities to be a representative voice activity of the plurality of voice activities. The selected representative voice activity is analyzed in step S409, and a demographic descriptor of the plurality of individuals is determined based on the selected representative voice activity in step 411. Accordingly, the method 401 as shown in FIG. 4, provides a single demographic descriptor for the plurality of individuals based on the selected one of the plurality of voice activities.

In the embodiment of the method 401 as shown FIG. 4, the representative voice activity is preferably selected by filtering the plurality of voice activities according to a predetermined paralinguistic property. For example, the representative voice activity is selected from the plurality of voice activities by selecting the voice activity having the loudest volume. In additional embodiments of the method 401 as shown in FIG. 4, the representative voice activity is selected according to pitch, frequency, tone, and/or intonation. Of course, those skilled in the art will appreciate that, in additional embodiments of the method 401, additional properties can also be used in addition to, or alternatively to, the properties listed above.

In an alternative embodiment of the method 401 as shown in FIG. 4, wherein a plurality of voice activities is detected, each voice activity is analyzed and a demographic descriptor is determined for each individual based on the detected voice activity of each individual. In such an embodiment, a response is preferably generated for each of the determined demographic descriptors. For example, in an exemplary embodiment of the alternative embodiment of the method 401 as shown in FIG. 4, a television room in a home is monitored. If a plurality of voice activities is detected, with each voice activity belonging to a different individual, then each voice activity is analyzed to determine a demographic descriptor. Then, a plurality of responses is generated with each response being based on one of the determined demographic descriptors. In such an exemplary embodiment, each response may be a picture-in-picture display on the television. Of course, those skilled in the art will appreciate that the above example is merely meant to be exemplary and that other responses may also be generated. The response can be generated either in the environment, or the demographic descriptor can be transmitted over a network and the response can be generated on the backend of the network.

The present disclosure also provides a system for generating demographic information relating to an individual. The system includes an audio capture device disposed in an environment for detecting a voice activity of an individual. When the audio capture device detects the voice activity, the detected voice activity is analyzed to determine, based on the detected voice activity, a demographic descriptor of the individual. In such an embodiment, the audio capture device is preferably configured to detect a plurality of voice activities, each belonging to one of a plurality of individuals. The audio capture device preferably selects one of the plurality of voice activities to be a representative voice activity of the plurality of voice activities, and determines, based on the selected representative voice activity, a demographic descriptor of the plurality of individuals.

An exemplary system 501 is shown in FIG. 5. The system 501 includes an audio capture device 503 for detecting a voice activity of an individual. In the exemplary system 501, the detected voice activity is transmitted, via a network 505, to the backend of the network 507 to be analyzed by an analyzer 509. The analyzer 509 analyzes the detected voice activity, and a determiner 511 determines, based on the detected and analyzed voice activity, a demographic descriptor of the individual. The backend network 507 of the system 501 also includes a response generator 513 for generating a response in the environment in response to the determined demographic descriptor. In the system 501 as shown in FIG. 5, the response to be generated is determined by looking up the demographic descriptor in a database 515.

The present disclosure also provides a tangible computer readable medium for storing a computer program for generating demographic information relating to an individual. The computer readable medium includes an executable monitoring code segment that monitors an environment for a voice activity of an individual, an executable detecting code segment that detects the voice activity of the individual in the environment, an executable analyzing code segment that analyzes the detected voice activity, and an executable determining code segment that determines, based on the detected voice activity of the individual, a demographic descriptor of the individual. In such an embodiment, the detecting code segment preferably detects a plurality of the voice activities, each belonging to one of a plurality of individuals, and the computer readable medium preferably includes an executable selecting code segment that selects one of the plurality of voice activities to be a representative voice activity. According to such an embodiment, the determining code segment determines, based on the selected representative voice activity, the demographic descriptor of the plurality of individuals.

Accordingly, the present disclosure enables generation of demographic information relating to an individual by detecting a voice activity of the individual. The demographic information is generated independently of the individual and eliminates the possibility of misidentification. For example, according to the known methodologies of identifying an individual in an online setting, a user of a website is identified by a user entered username and password. However, if a user enters the username and password of another, the website is unable to detect the misidentification. Furthermore, if a first user fails to logout of a website, the website would have no way of identifying, or even knowing the existence of, a second user that begins accessing the website via the first user's username and password. However, according to the present disclosure, a voice activity of the second user would be detected and analyzed, and it would be known that the second user is a different individual than the first user and that the second user may also comprise a different profile than the first user. Furthermore, the present disclosure also enables identification while eliminating the requirement of a login altogether. Of course, those skilled in the art will appreciate that the examples recited above are to be considered merely exemplary and further appreciate that the method, system, and computer readable medium of the present disclosure may have different uses and may be used in additional environments.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the audio capture device described herein may be any kind of phone for a customer to call a customer care center or sales number. In this regard, the customer care center or sales center can target how to respond to the customer based on what the human representative of the customer care center or sales number hears or based on what the voice response system hears as the customer navigates the menus via speech. Accordingly, when the customer answers questions via speech, the voice response system is effectively more accurately profiling the user. If the customer speaks their ID number or some other account information or just speaks the reason for the call "buy new cell phone," then the response can be customized based on what the voice response system has already determined.

Furthermore, the present disclosure may also be useful in identifying a particular individual of a plurality of known individuals. For example, if there are four known members in a household, the present disclosure may be useful in determining which individual in the household is watching the television or surfing the World Wide Web. Furthermore, in addition to, or alternatively to, detecting and analyzing voice activity via an audio capture device, the present disclosure may detect and analyze a voice activity and/or a visual activity via a video capture device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of determining a response to be generated in an environment, the method comprising:
   monitoring the environment for a voice activity of an individual;
   detecting the voice activity of the individual;
   correlating, with a processor, the voice activity of the individual and known information of the environment, the known information corresponding to media content that is provided in the environment;
   determining, with the processor and based on a correlation of the voice activity of the individual and the known information of the environment, a content descriptor of the voice activity;
   determining, with the processor and based on the voice activity of the individual, a demographic descriptor of the individual; and
   correlating, with the processor, the content descriptor and the demographic descriptor to determine the response to be generated in the environment.

2. The method as set forth in claim 1, wherein the known information corresponds to visual content that is displayed in the environment.

3. The method as set forth in claim 1, wherein the known information corresponds to audio content that is played in the environment.

4. The method as set forth in claim 1, wherein
   a plurality of voice activities is detected, each belonging to one of a plurality of individuals,
   the method further comprises:
      selecting one of the plurality of voice activities to be a representative voice activity of the plurality of voice activities for analyzing the representative voice activity, and
   the content descriptor and the demographic descriptor are determined based on the representative voice activity.

5. The method as set forth in claim 4, wherein the representative voice activity is selected by filtering the plurality of voice activities according to a predetermined paralinguistic property.

6. The method as set forth in claim 1, wherein
   a plurality of voice activities is detected, each belonging to one of a plurality of individuals,
   the plurality of voice activities is analyzed, and
   a plurality of demographic descriptors is determined for the plurality of individuals based on the plurality of voice activities.

7. The method as set forth in claim 6, wherein the content descriptor and the plurality of demographic descriptors are correlated to determine a plurality of responses to be generated in the environment.

8. The method as set forth in claim 1, wherein the environment is a public environment.

9. The method as set forth in claim 1, further comprising:
   detecting visual activity of the individual;
   analyzing, with the processor, the visual activity of the individual; and
   correlating, with the processor, the voice activity and the visual activity of the individual to determine the demographic descriptor.

10. The method as set forth in claim 1, wherein the voice activity is detected with an audio capturer that includes an input that enables the individual to input an input activity for determining the demographic descriptor.

11. The method as set forth in claim 1, further comprising:
   storing the demographic descriptor in a database in association with the individual for creating a profile of the individual.

12. The method as set forth in claim 11, wherein the profile associated with the individual is configured to be accessible by the individual for displaying the profile on a social networking website.

13. The method as set forth in claim 1, further comprising:
   detecting the voice activity of the individual for a predetermined period of time;
   wherein the voice activity is analyzed over the predetermined period of time for determining the content descriptor and the demographic descriptor.

14. The method as set forth in claim 1, wherein
   the voice activity is detected with an audio capturer, and
   the voice activity is transmitted over a network for analyzing the voice activity for determining the content descriptor and the demographic descriptor.

15. The method as set forth in claim 1, further comprising:
   receiving an input from the individual for one of accepting and rejecting the demographic descriptor.

16. A system for determining a response to be generated in an environment, the system comprising:
   a processor that detects a voice activity of an individual; and
   a memory storing instructions that, when executed by the processor, cause the processor to perform operations including:
      correlating the voice activity of the individual and known information of the environment, the known information corresponding to media content that is provided in the environment;
      determining, based on a correlation of the voice activity of the individual and the known information of the environment, a content descriptor of the voice activity;
      determining, based on the voice activity of the individual, a demographic descriptor of the individual; and
      correlating the content descriptor and the demographic descriptor to determine the response to be generated in the environment.

17. The system as set forth in claim 16, wherein the known information corresponds to visual content that is displayed in the environment.

18. The system as set forth in claim 16, wherein the known information corresponds to audio content that is played in the environment.

19. The system as set forth in claim 16, wherein
the processor detects a plurality of voice activities, each belonging to one of a plurality of individuals, and
the processor selects one of the plurality of voice activities to be a representative voice activity of the plurality of voice activities, analyzes the representative voice activity, and determines the content descriptor and the demographic descriptor based on the representative voice activity.

20. A non-transitory computer readable medium having an executable computer program for determining a response to be generated in an environment that, when executed by a processor, causes the processor to perform operations comprising:
monitoring the environment for a voice activity of an individual;
detecting the voice activity of the individual;
correlating the voice activity of the individual and known information of the environment, the known information corresponding to media content that is provided in the environment;
determining, based on a correlation of the voice activity of the individual and the known information of the environment, a content descriptor of the voice activity;
determining, based on the voice activity of the individual, a demographic descriptor of the individual; and
correlating the content descriptor and the demographic descriptor to determine the response to be generated in the environment.

* * * * *